(12) United States Patent
Koo et al.

(10) Patent No.: US 8,598,987 B2
(45) Date of Patent: Dec. 3, 2013

(54) RFID COMMUNICATION METHOD AND SYSTEM

(75) Inventors: Ji-Hun Koo, Yongin-si (KR);
Young-Hoon Min, Anyang-si (KR);
Seon-Wook Kim, Namyangju-si (KR);
Joon-Goo Lee, Seoul (KR); Young-Sun Han, Seoul (KR)

(73) Assignees: Samsung Electronics Co., Ltd., Suwon-si, Gyeonggi-do (KR); Korea University Research and Business Foundation, Seoul (KR)

( * ) Notice: Subject to any disclaimer, the term of this patent is extended or adjusted under 35 U.S.C. 154(b) by 801 days.

(21) Appl. No.: 12/656,665

(22) Filed: Feb. 12, 2010

(65) Prior Publication Data

US 2010/0201492 A1      Aug. 12, 2010

(30) Foreign Application Priority Data

Feb. 12, 2009   (KR) .................. 10-2009-0011627

(51) Int. Cl.
*H04Q 5/22* (2006.01)
(52) U.S. Cl.
USPC .......................... 340/10.1; 340/10.2; 370/342
(58) Field of Classification Search
USPC ................ 340/10.1, 10.2; 370/342; 375/140; 367/118
See application file for complete search history.

(56) References Cited

U.S. PATENT DOCUMENTS

| | | | | |
|---|---|---|---|---|
| 5,353,300 | A | * | 10/1994 | Lee et al. ................. 370/342 |
| 7,092,440 | B1 | * | 8/2006 | Dress et al. .............. 375/140 |
| 7,327,257 | B2 | | 2/2008 | Posamentier |
| 7,336,563 | B2 | * | 2/2008 | Holm ........................ 367/118 |
| 2002/0136269 | A1 | * | 9/2002 | Kurabe et al. ............ 375/140 |
| 2005/0232081 | A1 | * | 10/2005 | Holm ........................ 367/118 |
| 2007/0222560 | A1 | * | 9/2007 | Posamentier .............. 340/10.2 |
| 2008/0036573 | A1 | | 2/2008 | Tsukamoto et al. |

FOREIGN PATENT DOCUMENTS

WO   WO 2008/027622   3/2008

* cited by examiner

*Primary Examiner* — Brian Zimmerman
*Assistant Examiner* — Omer S Khan
(74) *Attorney, Agent, or Firm* — Lee & Morse, P.C.

(57) ABSTRACT

In a method of communicating in a radio frequency identification (RFID) system including a RFID reader and a plurality of RFID tags, a plurality of spread spectrum data are stored in the plurality of RFID tags. The plurality of spread spectrum data are transmitted from the plurality of RFID tags to the RFID reader. A plurality of original data respectively corresponding to the plurality of RFID tags are simultaneously extracted from the plurality of spread spectrum data at the RFID reader.

2 Claims, 6 Drawing Sheets

$$H2 = \begin{bmatrix} 0 & 0 \\ 0 & 1 \end{bmatrix}$$

$$H4 = \begin{bmatrix} 0 & 0 & 0 & 0 \\ 0 & 1 & 0 & 1 \\ 0 & 0 & 1 & 1 \\ 0 & 1 & 1 & 0 \end{bmatrix}$$

$$\vdots$$

$$H2^n = \begin{bmatrix} H2^{n-1} & H2^{n-1} \\ H2^{n-1} & \overline{H2^{n-1}} \end{bmatrix} = \begin{bmatrix} OC1 \\ OC2 \\ OC3 \\ \vdots \\ OC2^n \end{bmatrix}$$

FIG. 5

| | RFID TAG1 | RFID TAG2 | RFID TAG3 | RFID TAG4 |
|---|---|---|---|---|
| ORIGINAL DATA | 1110 | 1010 | 0110 | X |
| ORTHOGONAL CODE | 0000 | 0101 | 0011 | 0110 |
| SUBSTITUTED ORIGINAL DATA | $-1-1-1+1$ | $-1+1-1+1$ | $+1+1-1-1$ | X |
| SUBSTITUTED ORTHOGONAL CODE | $+1+1+1+1$ | $+1-1+1-1$ | $+1+1-1-1$ | $+1-1-1+1$ |
| SPREAD SPECTRUM DATA | $-1-1-1-1$<br>$-1-1-1-1$<br>$-1-1-1-1$<br>$+1+1+1+1$ | $-1+1-1+1$<br>$+1-1+1-1$<br>$-1+1-1+1$<br>$+1-1+1-1$ | $+1+1-1-1$<br>$-1-1+1+1$<br>$-1-1+1+1$<br>$+1+1-1-1$ | X |
| SUM OF A PLURALITY OF SPREAD SPECTRUM DATA | | $-1+1-3-1$ $-1-3+1-1$ $-3-1-1+1$ $+3+1+1-1$ | | |
| DESPREAD DATA | $-1+1-3-1(=-4)$<br>$-1-3+1-1(=-4)$<br>$-3-1-1+1(=-4)$<br>$+3+1+1-1(=+4)$ | $-1-1-3+1(=-4)$<br>$-1+3+1+1(=+4)$<br>$-3+1-1-1(=-4)$<br>$+3-1+1+1(=+4)$ | $-1+1+3+1(=+4)$<br>$-1-3-1+1(=-4)$<br>$-3+1-1-1(=-4)$<br>$+3+1-1+1(=+4)$ | $-1-1+3-1(=0)$<br>$-1+3-1-1(=0)$<br>$-3+1+1+1(=0)$<br>$+3-1-1-1(=0)$ |
| EXTRACTED DATA | 1110 | 1010 | 0110 | X |

FIG. 6

RFID COMMUNICATION METHOD AND SYSTEM

BACKGROUND

1. Field

Example embodiments relate to a radio frequency identification (RFID) communication method and method, and, more particularly, to a method and system of simultaneously communicating with a plurality of RFID tags in a RFID system.

2. Description of the Related Art

A radio frequency identification (RFID) communication system includes a RFID reader and a plurality of RFID tags. The RFID reader transmits a command to the RFID tags by designating a RFID tag to respond and the designated RFID tag transmits data to the RFID reader in response to the command.

If the plurality of RFID tags simultaneously transmits a plurality of data to the RFID reader in the conventional RFID communication system, the RFID reader cannot recover the plurality of data received from the plurality of RFID tags.

SUMMARY

Embodiments are therefore directed to a RFID communication method, which substantially overcome one or more of the problems due to the limitations and disadvantages of the related art.

It is a feature of some example embodiments provide a radio frequency identification (RFID) communication method and system capable of simultaneously communicating with a plurality of RFID tags.

It is another feature of some example embodiments to provide RFID communication method and system efficiently utilizing a bandwidth of a communication channel.

It is yet another feature of some example embodiments to provide RFID communication method and system improving throughput.

At least one of the above and other features and advantages may be realized by providing a communication method in a radio frequency identification (RFID) system including a RFID reader and a plurality of RFID tags according to some example embodiments, a plurality of spread spectrum data are stored in the plurality of RFID tags. The plurality of spread spectrum data are transmitted from the plurality of RFID tags to the RFID reader. A plurality of original data respectively corresponding to the plurality of RFID tags are simultaneously extracted from the plurality of spread spectrum data at the RFID reader.

In some embodiments, the plurality of spread spectrum data may be generated by spreading the plurality of original data with a plurality of orthogonal codes respectively corresponding to the plurality of RFID tags.

In some embodiments, each of the plurality of spread spectrum data may be generated by multiplying each bit of corresponding original data by a corresponding orthogonal code of the plurality of the orthogonal codes.

In some embodiments, the plurality of orthogonal codes may be orthogonal to one another.

In some embodiments, the plurality of orthogonal codes may respectively correspond to identifications of the plurality of RFID tags.

In some embodiments, each of the plurality of orthogonal codes may be determined based on lower N bits of an identification of a corresponding RFID tag when a number of the plurality of RFID tags is more than $2^{(N-1)}$ and no more than $2^N$, where N is an integer no less than 1.

In some embodiments, the plurality of orthogonal codes may be generated based on a Hadamard matrix.

In some embodiments, to simultaneously extract the plurality of original data, a sum of the plurality of spread spectrum data may be despread with a plurality of orthogonal codes respectively corresponding to the plurality of RFID tags.

In some embodiments, each of the plurality of original data may be extracted by using a corresponding orthogonal code.

At least one of the above and other features and advantages may be realized by providing a communication method in a radio frequency identification (RFID) system including a RFID reader and a plurality of RFID tags according to some example embodiments, a plurality of spread spectrum data are stored in the plurality of RFID tags. A data request command is transmitted from the RFID reader to the plurality of RFID tags by designating at least one RFID tag of the plurality of RFID tags. Spread spectrum data stored in the at least one designated RFID tag or original data extracted from the spread spectrum data stored in the at least one designated RFID tag is transmitted from the at least one designated RFID tag to the RFID reader in response to the data request command. If the RFID reader receives the spread spectrum data, the original data is extracted from the spread spectrum data received from the at least one designated RFID tag at the RFID reader.

In some embodiments, to transmit the spread spectrum data or the original data, if the data request command indicates that two or more RFID tags of the plurality of RFID tags are designated, the spread spectrum data stored in the two or more RFID tags may be transmitted from the two or more RFID tags to the RFID reader, and if the data request command indicates that one RFID tag of the plurality of RFID tags is designated, the original data may be transmitted from the one RFID tag to the RFID reader by extracting the original data from the spread spectrum data stored in the one RFID tag.

In some embodiments, to transmit the original data from the one RFID tag, the original data may be extracted from the spread spectrum data stored in the one RFID tag at the one RFID tag based on a number of bits of an orthogonal code and an index of the orthogonal code.

In some embodiments, the original data may be extracted at the one RFID tag by using an equation as follows:

$$Y[N]=X[OCBL*(N-1)+OCI]$$

where $Y[N]$ represents a N-th bit of the original data, OCBL represents the number of bits of the orthogonal code, OCI represents the index of the orthogonal code, $X[OCBL*(N-1)+OCI]$ represents an $(OCBL*(N-1)+OCI)$-th bit of the spread spectrum data stored in the one RFID tag, and N is an integer no less than 1.

In some embodiments, the data request command may include identification information of the at least one designated RFID tag.

In some embodiments, to transmit the spread spectrum data or the original data, if the data request command includes the identification information of two or more RFID tags of the plurality of RFID tags, the spread spectrum data stored in the two or more RFID tags may be transmitted from the two or more RFID tags to the RFID reader, and if the data request command includes the identification information of one RFID tag of the plurality of RFID tags, the original data may be transmitted from the one RFID tag to the RFID reader by extracting the original data from the spread spectrum data stored in the one RFID tag.

At least one of the above and other features and advantages may be realized by providing A radio frequency identification (RFID) system, including a plurality of RFID tags, each RFID tag being configured to transmit spread spectrum data, and a RFID reader configured to simultaneously extract original data respectively corresponding to the plurality of RFID tags from the plurality of spread spectrum data, when receiving spread spectrum data from more than one RFID tag simultaneously, and transmit a data request command to the plurality of RFID tags by designating at least one RFID tag of the plurality of RFID tags.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0011627, filed on Feb. 12, 2009, in the Korean Intellectual Property Office, and entitled: "RFID Communication Method," is incorporated by reference herein in its entirety.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of elements may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
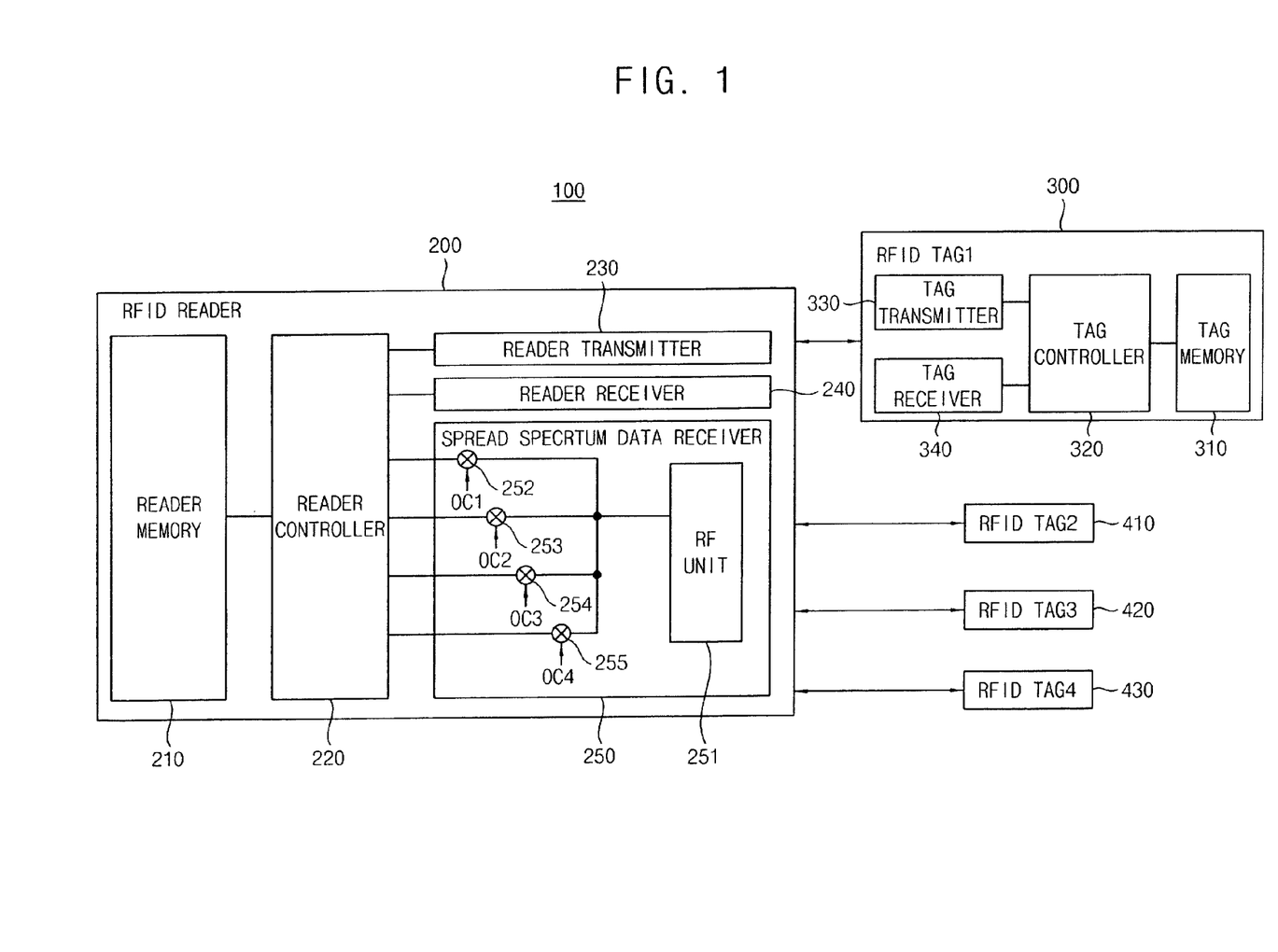
FIG. 1 illustrates a block diagram of a radio frequency identification (RFID) system according to some example embodiments.

FIG. 1 illustrates a block diagram of a radio frequency identification (RFID) system according to some example embodiments. Referring to FIG. 1, a RFID system 100 may include a RFID reader 200 and a plurality of RFID tags 300, 410, 420 and 430.

The RFID reader 200 may include a reader memory 210, a reader controller 220, a reader transmitter 230, a reader receiver 240, and a spread spectrum data receiver 250. The reader memory 210 may store data received from the plurality of RFID tags 300, 410, 420 and 430 and/or commands to be transmitted to the plurality of RFID tags 300, 410, 420 and 430. The reader memory 210 may further store execution codes for operating the RFID reader 200.

The reader transmitter 230 may transmit the commands to the plurality of RFID tags 300, 410, 420 and 430. In some embodiments, the reader transmitter 230 may modulate the commands and transmit the modulated commands. For example, the reader transmitter 230 may perform pulse width modulation (PWM), pulse interval modulation (PIM), or the like.

The reader receiver 240 may receive the data from the plurality of RFID tags 300, 410, 420 and 430. In some embodiments, the plurality of RFID tags 300, 410, 420 and 430 may transmit modulated data, and the reader receiver 240 may recover the data by demodulating the modulated data. For example, the reader receiver 240 may perform amplitude shift keying (ASK) demodulation, phase shift keying (PSK) demodulation, or the like.

The reader controller 220 may control the reader memory 210, the reader transmitter 230, the reader receiver 240, and the spread spectrum data receiver 250. The reader controller 220 may provide the commands to the reader transmitter 230, and may receive the data from the reader receiver 240. The reader controller 220 may store the received data in the reader memory 210 or provide the received data to an external device, such as a host device.

The spread spectrum data receiver 250 may receive a plurality of spread spectrum data from the plurality of RFID tags 300, 410, 420, and 430, and may simultaneously extract a plurality of original data from the plurality of spread spectrum data. The spread spectrum data receiver 250 may include a radio frequency (RF) unit 251 and a plurality of multipliers 252, 253, 254, and 255. The RF unit 251 may simultaneously receive the plurality of spread spectrum data from the plurality of RFID tags 300, 410, 420, and 430. Thus, the RF unit 251 may receive the sum of the plurality of spread spectrum data.

In some embodiments, the RF unit 251 may have a configuration similar to the reader receiver 240. The plurality of multipliers 252, 253, 254, and 255 may multiply the sum of the plurality of spread spectrum data by a plurality of orthogonal codes OC1, OC2, OC3, and OC4, respectively. The plurality of orthogonal codes OC1, OC2, OC3, and OC4 may respectively correspond to the plurality of RFID tags 300, 410, 420 and 430. Accordingly, the plurality of original data respectively corresponding to the plurality of RFID tags 300, 410, 420, and 430 may be respectively extracted.

For example, a first multiplier 252 may perform a multiplication operation on the sum and a first orthogonal code OC1 to extract first original data corresponding to a first RFID tag 300. A second multiplier 253 may perform a multiplication operation on the sum and a second orthogonal code OC2 to extract second original data corresponding to a second RFID tag 410. A third multiplier 254 may perform a multiplication operation on the sum and a third orthogonal code OC3 to extract third original data corresponding to a third RFID tag 420. A fourth multiplier 255 may perform a multiplication operation on the sum and a fourth orthogonal code OC4 to extract fourth original data corresponding to a fourth RFID tag 430.

Each RFID tag 300, 410, 420, and 430 may include a tag memory 310, a tag controller 320, a tag transmitter 330, and a tag receiver 340 (only illustrated for RFIG tag 300 for clarity). The tag memory 310 may store identification (ID) of a corresponding RFID tag 300, 410, 420, and 430 and spread spectrum data.

For example, the tag memory 310 of the first RFID tag 300 may store ID of the first RFID tag 300 and the spread spectrum data. For example, the spread spectrum data of the first RFID tag 300 may be generated by spreading the first original data by using the first orthogonal code OC1. In some embodiments, the tag memory 310 may include at least one of a random access memory (RAM), a read-only memory (ROM), a mask ROM, and a non-volatile memory such as an electrically erasable and programmable read only memory (EEPROM), a flash memory, etc.

The tag transmitter 330 may transmit the spread spectrum data to the RFID reader 200. In some embodiments, the tag transmitter 330 may modulate the spread spectrum data and transmit the modulated spread spectrum data. For example, the tag transmitter 330 may perform ASK modulation, PSK modulation, or the like.

The tag receiver 340 may receive a command from the RFID reader 200. In some embodiments, the RFID reader 200 may transmit a modulated command, and the tag receiver 340 may demodulate the modulated command. The tag controller 320 may control the tag memory 310, tag transmitter 330 and the tag receiver 340. The tag controller 320 may read the spread spectrum data from the tag memory 310 in response to the command provided from the tag receiver 340, and may provide the read spread spectrum data to the tag transmitter 330.

The tag memories 310 of the plurality of RFID tags 300, 410, 420, and 430 may store the plurality of spread spectrum data that are generated by spreading the plurality of original data by using the plurality of orthogonal codes OC1, OC2, OC3, and OC4, respectively. The plurality of spread spectrum data are spread in advance before the tag memories 310 store the plurality of spread spectrum data. Since the tag memories 310 store the plurality of spread spectrum data instead of the plurality of original data, the plurality of RFID tags 300, 410, 420, and 430 need not perform a spreading operation. Further, the plurality of RFID tags 300, 410, 420, and 430 may be easily implemented.

The RFID reader 200 may simultaneously extract the plurality of original data from the plurality of spread spectrum data received from the plurality of RFID tags 300, 410, 420, and 430. Since the RFID reader 200 simultaneously communicates with the plurality of RFID tags 300, 410, 420, and 430, the RFID system 100 may efficiently utilize a bandwidth of a communication channel and improve the throughput.

In some embodiments, the RFID reader 200 may be coupled to a host device and may provide the host device with the plurality of original data extracted from the plurality of spread spectrum data. The RFID system 100 may be employed in product management systems, distribution/delivery system, warehousing management systems, automatic inspection systems, inventory management systems, library management systems, etc. Each RFID tag 300, 410, 420, and 430 may be a passive RFID tag, an active RFID tag, or a semi-active RFID tag. In some embodiments, each RFID tag 300, 410, 420, and 430 may use a backscatter scheme that transmits data to the RFID reader 200 by reflecting energy provided from the RFID reader 200. For example, each RFID tag 300, 410, 420, and 430 may transmit data to the RFID reader 200 by using a carrier signal received from the RFID reader 200.

Figure 2:
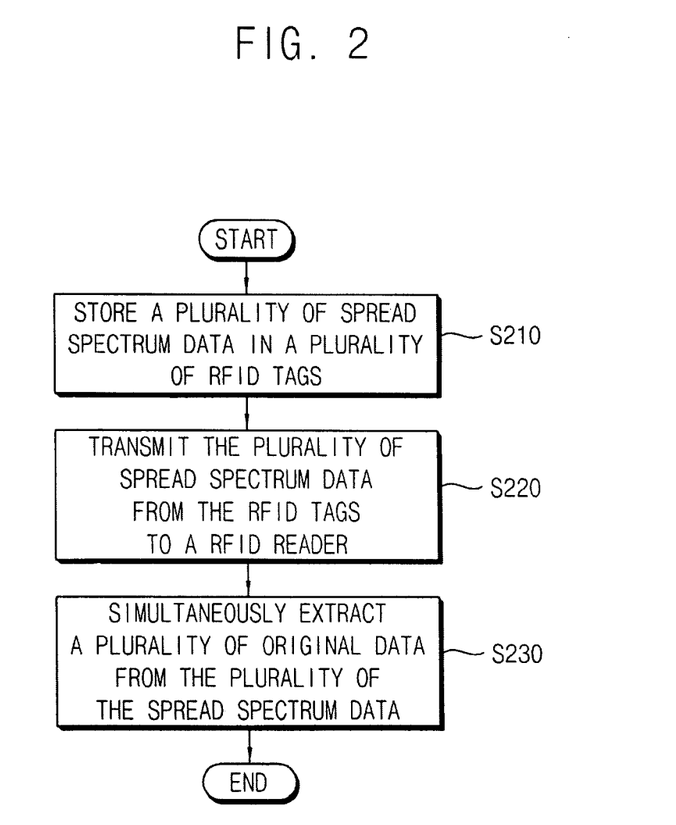
FIG. 2 illustrates a flow chart of a RFID communication method according to some example embodiments.

FIG. 2 illustrates a flow chart of a RFID communication method according to some example embodiments.

Referring to FIGS. 1 and 2, a plurality of spread spectrum data are stored in a plurality of RFID tags 300, 410, 420, and 430 (operation S210). The plurality of spread spectrum data is generated by spreading a plurality of original data by using a plurality of orthogonal codes OC1, OC2, OC3, and OC4. For example, if a length of one original data is 4 bits and a length of one orthogonal code is 8 bits, one spread spectrum data of 32 bits may be generated. Spread spectrum data stored in different RFID tags may be generated by using different orthogonal codes. The plurality of orthogonal codes OC1, OC2, OC3, and OC4 may be orthogonal to one another. The plurality of orthogonal codes OC1, OC2, OC3, and OC4 may correspond to IDs of the plurality of RFID tags 300, 410, 420 and 430, respectively.

The plurality of RFID tags 300, 410, 420, and 430 transmit the plurality of spread spectrum data to the RFID reader 200 (operation S220). The plurality of RFID tags 300, 410, 420, and 430 may simultaneously transmit the plurality of spread spectrum data to the RFID reader 200, and the RFID reader 200 may receive the sum of the plurality of spread spectrum data. In some embodiments, the RFID reader 200 may transmit a data request command by designating at least one RFID tag of the plurality of RFID tags 300, 410, 420, and 430, and the at least one designated RFID tag may transmit spread spectrum data or original data to the RFID reader 200 in response to the data request command.

The RFID reader 200 may simultaneously extract the plurality of original data respectively corresponding to the plurality of RFID tags 300, 410, 420, and 430 from the plurality of spread spectrum data (operation S230). The RFID reader 200 may despread the plurality of spread spectrum data by using the plurality of orthogonal codes OC1, OC2, OC3, and OC4 to simultaneously recover the plurality of original data.

Accordingly, in the RFID communication method according to some example embodiments, the plurality of RFID tags 300, 410, 420, and 430 need not perform a spreading operation. Thus, the plurality of RFID tags 300, 410, 420, and 430 may be easily implemented. Further, in the RFID communication method according to some example embodiments, a bandwidth of a communication channel may be efficiently utilized and the throughput may be improved since the RFID reader 200 simultaneously communicates with the plurality of RFID tags 300, 410, 420, and 430.

Hereinafter, data storage operation and data recovery operation will be described with reference to FIGS. 3A through 3C.

Figure 3A:
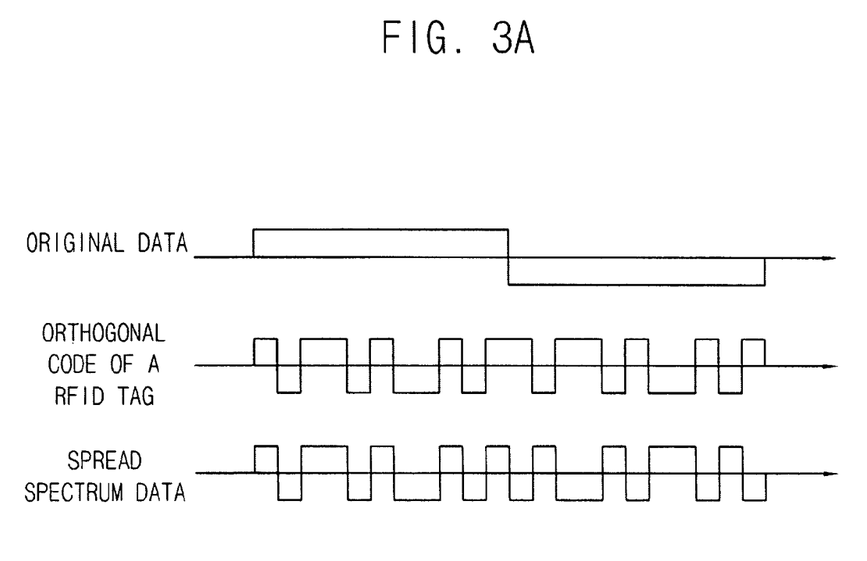
FIG. 3A illustrates a diagram for the spread spectrum data stored in a RIFD tag.

FIG. 3A illustrates spread spectrum data stored in a RIFD tag. FIG. 3B illustrates data extracted by despreading the spread spectrum data received from the RFID tag with an orthogonal code corresponding to the RFID tag in a RFID reader. FIG. 3C illustrates data extracted by despreading the spread spectrum data received from the RFID tag with an orthogonal code not corresponding to the RFID tag in the RFID reader.

Referring to FIGS. 1 and 3A, spread spectrum data generated by spreading original data with an orthogonal code are stored in the tag memory 310 of the RFID tag 300. The original data may be spread by multiplying each bit of the original data by the orthogonal code.

Figure 3B:
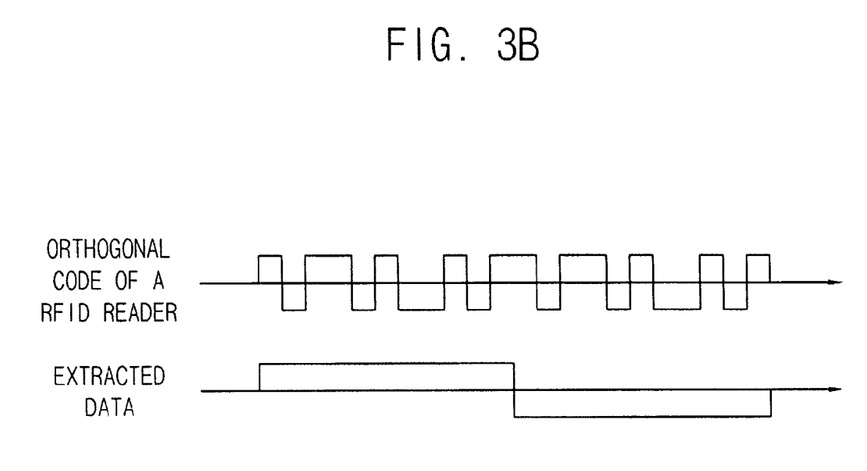
FIG. 3B is a diagram for illustrating data extracted by despreading the spread spectrum data received from the RFID tag with an orthogonal code corresponding to the RFID tag in a RFID reader.

Referring to FIGS. 1 and 3B, if the RFID reader 200 despreads the spread spectrum data with the orthogonal code corresponding to the RFID tag 300, which is used when the spread spectrum data is generated, the RFID reader 200 may extract the original data. The RFID reader 200 may recover the original data by multiplying each bit of the spread spectrum data received from the RFID tag 300 by the orthogonal code.

Figure 3C:
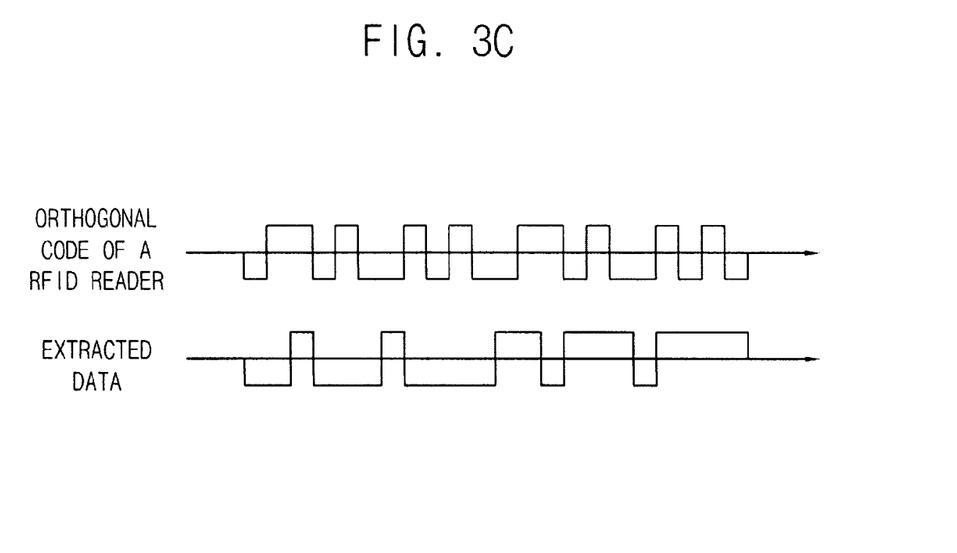
FIG. 3C is a diagram for illustrating data extracted by despreading the spread spectrum data received from the RFID tag with an orthogonal code not corresponding to the RFID tag in the RFID reader.

Referring to FIGS. 1 and 3C, if the RFID reader 200 despreads the spread spectrum data with the orthogonal code not corresponding to the RFID tag 300, the RFID reader 200 may not extract the original data. If the RFID reader 200 performs a multiplication operation on the spread spectrum data received from the RFID tag 300 and an orthogonal code that is different from the orthogonal code used when the spread spectrum data is generated, the original data may not be recovered and data having an error may be extracted. In this case, the RFID reader 200 may consider that the spread spectrum data is not transmitted from the RFID tag 300.

Figure 4:
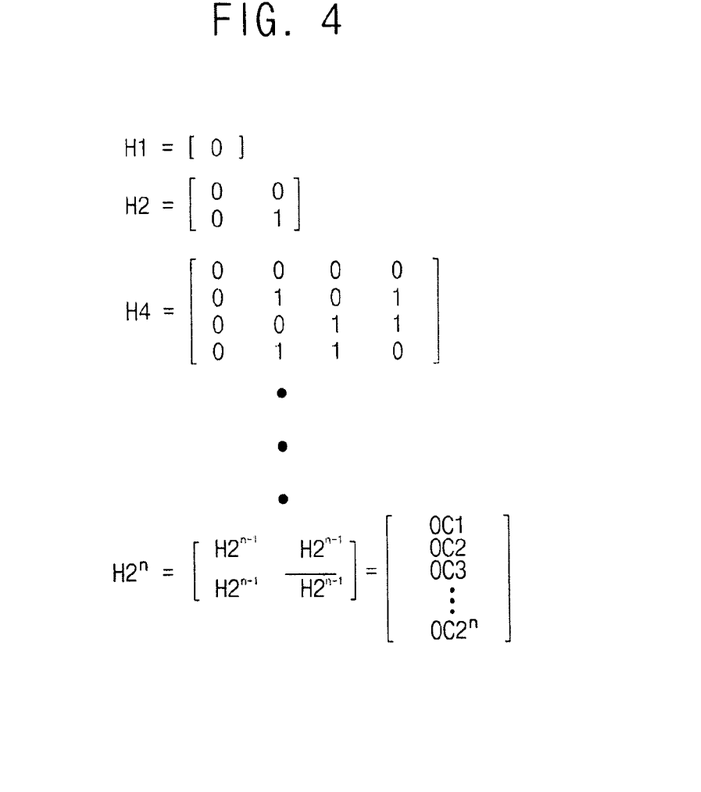
FIG. 4 illustrates a diagram for a method of generating orthogonal codes in a RIFD system according to some example embodiments.

FIG. 4 illustrates a method of generating orthogonal codes in a RIFD system according to some example embodiments. Referring to FIGS. 1 and 4, orthogonal codes used in the RFID system 100 may be generated by using at least one of Hadamard matrixes H1, H2, H4, to H2^n. A n-th Hadamard matrix H2^n may be obtained from a (n−1)-th Hadamard matrix H2^(n−1).

Rows of the respective Hadamard matrixes H1, H2, H4, and H2^n are orthogonal to one another. Accordingly, the rows of the respective Hadamard matrixes H1, H2, H4, and H2^n may be used as the orthogonal codes. When the number of RFID tags is more than 2^(n−1) and no more than 2^n, the rows OC1, OC2, OC3, to OC2^n of the n-th Hadamard matrix H2^n may be used as the orthogonal codes. For example, when the RFID system 100 includes four RFID tags 300, 410, 420, and 430, the RFID system 100 may use the 4*4 Hadamard matrix H4. The RFID system 100 may use a first row of the Hadamard matrix H4 (i.e., "0000") as a first orthogonal code corresponding to the first RFID tag 300, a second row of the Hadamard matrix H4 (i.e., "0101") as a second orthogonal code corresponding to the second RFID tag 410, a third row of the Hadamard matrix H4 (i.e., "0011") as a third orthogonal code corresponding to the third RFID tag 420, and a fourth row of the Hadamard matrix H4 (i.e., "0110") as a fourth orthogonal code corresponding to the fourth RFID tag 430.

In some embodiments, the orthogonal codes may correspond to identifications (IDs) of the plurality of RFID tags 300, 410, 420, and 430. For example, the IDs may be tag IDs of 96 bits or 64 bits. The orthogonal codes may be determined based on lower N bits of the identifications of the RFID tags 300, 410, 420, and 430, where N is an integer no less than 1. For example, if two lower bits of the ID of the first RFID tag 300 are "00", the first row of the Hadamard matrix H4 (i.e., "0000") may be used as the first orthogonal code. If two lower bits of the ID of the second RFID tag 410 are "01", the second row of the Hadamard matrix H4 (i.e., "0101") may be used as the second orthogonal code. If two lower bits of the ID of the third RFID tag 420 are "10", the third row of the Hadamard matrix H4 (i.e., "0011") may be used as the third orthogonal code. If two lower bits of the ID of the fourth RFID tag 430 are "11", the fourth row of the Hadamard matrix H4 (i.e., "0110") may be used as the fourth orthogonal code. Thus, the RFID reader 200 may determine the orthogonal codes corresponding to the RFID tags 300, 410, 420 and 430 from the IDs of the RFID tags 300, 410, 420 and 430.

Figure 5:
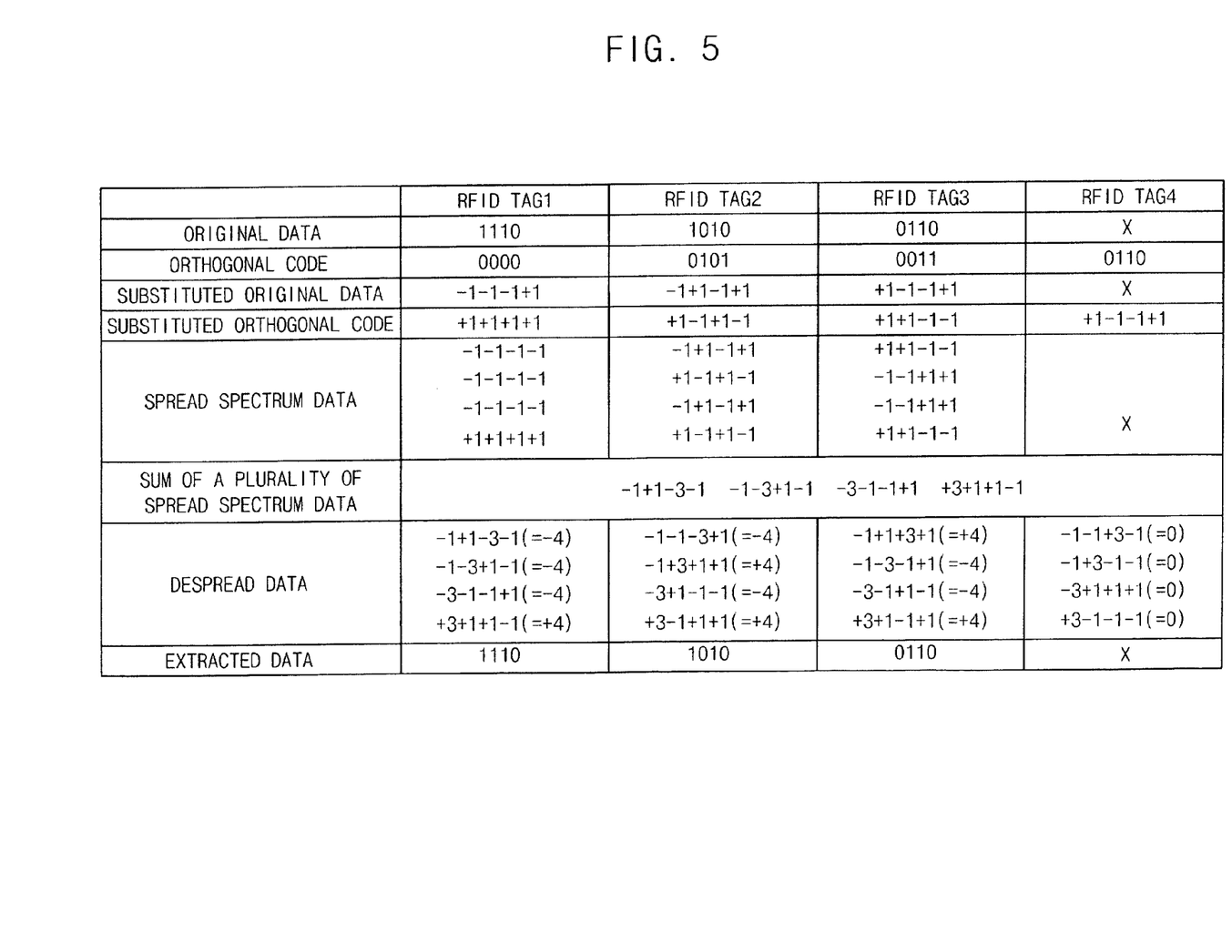
FIG. 5 illustrates a diagram for methods of spreading and despreading data in a RFID system according to some example embodiments.

FIG. 5 illustrates methods of spreading and despreading data in a RFID system according to some example embodiments. Referring to FIGS. 1 and 5, the first RFID tag 300 is intended to transfer first original data "1110" to the RFID reader 200, the second RFID tag 410 is intended to transfer second original data "1010" to the RFID reader 200, the third RFID tag 420 is intended to transfer third original data "0110" to the RFID reader 200, and the fourth RFID tag 430 has no data to be transferred to the RFID reader 200.

The first RFID tag 300 may store first spread spectrum data instead of the first original data in the tag memory 310. The first spread spectrum data may be generated by spreading the first original data "1110" with the first orthogonal code "0000". Here, "0" is substituted with "+1" and "1" is substituted with "−1" for convenience of calculation. For example, the first original data "1110" is substituted with "−1−1−1+1", and the first orthogonal code "0000" is substituted with "+1+1+1+1". The first RFID tag 300 may store the first spread spectrum data "−1−1−1−1 −1−1−1−1 −1−1−1−1 +1+1+1+1" corresponding to the first original data "1110". That is, if a first bit "−1" of the first substituted original data "−1−1−1+1" is spread with the first substituted orthogonal code "+1+1+1+1", first to fourth bits "−1−1−1−1" of the first spread spectrum data are generated. Fifth to eighth bits "−1−1−1−1" of the first spread spectrum data are generated by spreading a second bit "−1" of the first substituted original data "−1−1−1+1" with the first substituted orthogonal code "+1+1+1+1". Ninth to twelfth bits "−1−1−1−1" of the first spread spectrum data are generated by spreading a third bit "−1" of the first substituted original data "−1−1−1+1" with the first substituted orthogonal code "+1+1+1+1". Thirteenth to sixteenth bits "+1+1+1+1" of the first spread spectrum data are generated by spreading a fourth bit "+1" of the first substituted original data "−1−1−1+1" with the first substituted orthogonal code "+1+1+1+1". The second RFID 410 may store second spread spectrum data "−1+1−1+1 +1−1+1−1 −1+1−1+1 +1−1+1−1" instead of the second original data "1010". The third RFID 420 may store third spread spectrum data "+1+1−1−1 −1−1+1+1 −1−1+1+1 +1+1−1−1" instead of the second original data "0110".

The first through the third RFID tags 300, 410 and 420 may simultaneously transmit the first spread spectrum data, the second spread spectrum data, and the third spread spectrum data to the RFID reader 200. The RFID reader 200 may receive the sum of the first spread spectrum data, the second spread spectrum data and the third spread spectrum data. That is, RFID reader 200 may receive the sum "−1+1−3−1 −1−3+1−1 −3−1−1+1 +3+1+1−1".

The RFID reader 200 may simultaneously extract the plurality of original data by simultaneously spreading the sum of the plurality of spread spectrum data with the orthogonal codes. If the sum "−1+1−3−1 −1−3+1−1 −3−1−1+1 +3+1+1−1" is despread with the first substituted orthogonal code "+1+1+1+1", the first original data "1110" may be recovered. If the sum "−1+1−3−1 −1−3+1−1 −3−1−1+1 +3+1+1−1" is despread with the second substituted orthogonal code "+1−1+1−1", the second original data "1010" may be recovered. If the sum "−1+1−3−1 −1−3+1−1 −3−1−1+1 +3+1+1−1" is despread with the third substituted orthogonal code "+1+1−1−1", the third original data "0110" may be recovered. If the sum "−1+1−3−1 −1−3+1−1 −3−1−1+1 +3+1+1−1" is despread with the fourth substituted orthogonal code "+1−1−1+1", no original data may be recovered.

As described above, in a RFID communication method according to some example embodiments, the plurality of RFID tags 300, 410, 420, and 430 may store the plurality of spread spectrum data instead of the plurality of original data. Thus, the plurality of RFID tags 300, 410, 420 and 430 need not perform a spreading operation. Further, in a RFID communication method according to some example embodiments, the plurality of spread spectrum data may be simultaneously transferred and the plurality of original data may be simultaneously extracted. Thus, a bandwidth of a communication channel may be efficiently utilized and the throughput may be improved.

Figure 6:
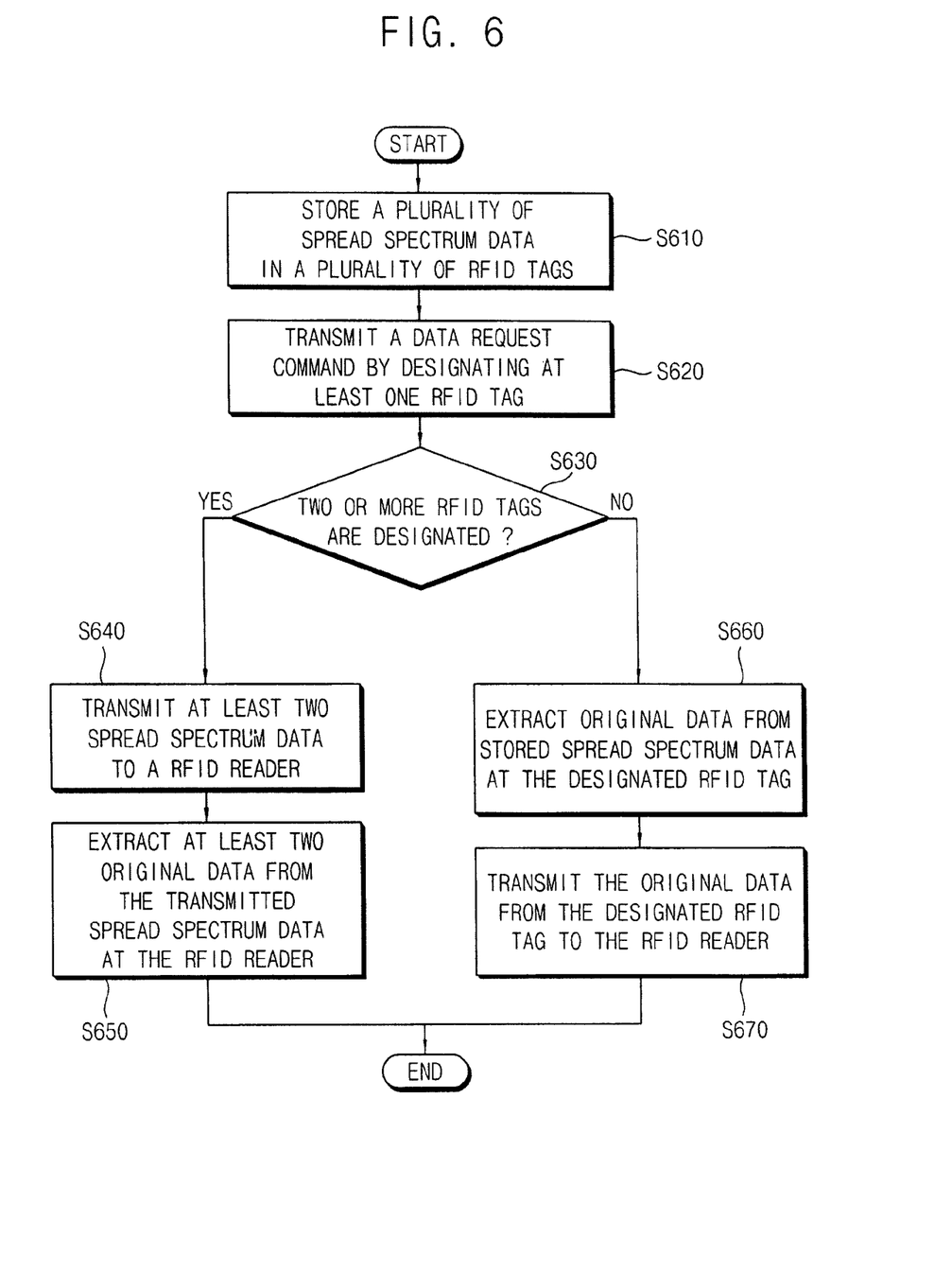
FIG. 6 illustrates a flow chart for a RFID communication method according to some example embodiments.

FIG. 6 illustrates a flow chart for a RFID communication method according to some example embodiments. Referring to FIGS. 1 and 6, a plurality of spread spectrum data may be stored in a plurality of RFID tags 300, 410, 420, and 430 (operation S610). The plurality of spread spectrum data may be generated by spreading a plurality of original data with a plurality of orthogonal codes OC1, OC2, OC3 and OC4. The plurality of RFID tags 300, 410, 420 and 430 may use different orthogonal codes OC1, OC2, OC3, and OC4 that are orthogonal to one another.

The RFID reader 200 may transmit a data request command to the plurality of RFID tags 300, 410, 420 and 430 by designating at least one RFID tag of the plurality of RFID tags 300, 410, 420 and 430 (operation S620). In some embodiments, the data request command may include identification information of the at least one designated RFID tag. Each RFID tag 300, 410, 420, and 430 may determine, based on the identification information included in the data request command, whether the RFID tag 300, 410, 420, and 430 is designated. The identification information may be an ID itself or a portion of the ID of the at least one designated RFID tag.

If two or more RFID tags are designated (operation S630: YES), at least two spread spectrum data are transmitted from the two or more designated RFID tags (operation S640). The two or more designated RFID tags may simultaneously transmit the at least two spread spectrum data to the RFID reader 200 and the RFID reader 200 may receive the sum of the at least two spread spectrum data from the two or more designated RFID tags.

The RFID reader 200 may extract at least two original data from the at least two spread spectrum data received from the two or more designated RFID tags (operation S650). The RFID reader 200 may simultaneously recover the at least two original data by simultaneously despreading the at least two spread spectrum data with at least two orthogonal codes respectively corresponding to the two or more designated RFID tags.

If one RFID tag is designated (operation S630: NO), the designated RFID tag may extract original data from spread spectrum data stored in the designated RFID tag (operation S660). In some embodiments, the designated RFID tag may extract the original data based on the number of bits of the orthogonal code and an index of the orthogonal code. For example, the designated RFID tag may extract the original data by using an equation as follows:

$$Y[N]=X[OCBL*(N-1)+OCI]$$

Where Y[N] represents a N-th bit of the original data, OCBL represents the number of bits of the orthogonal code, OCI represents the index of the orthogonal code, and X[OCBL*(N−1)+OCI] represents an (OCBL*(N−1)+OCI)-th bit of the spread spectrum data.

For example, when the second RFID tag 410 stores spread spectrum data "0101 1010 0101 1010" generated by spreading original data "1010" with an orthogonal code "0101", the second RFID tag 410 may extract a first bit "1" of the original data from (4*(1−1)+2)-th bit of the spread spectrum data, a second bit "0" of the original data from (4*(2−1)+2)-th bit of the spread spectrum data, a third bit "1" of the original data from (4*(3−1)+2)-th bit of the spread spectrum data, and a fourth bit "0" of the original data from (4*(4−1)+2)-th bit of the spread spectrum data. Accordingly, the second RFID tag 410 may perform only simple logical operations to extract the original data.

The designated RFID tag transmits the extracted original data to the RFID reader 200 (operation S670). The RFID reader 200 may receive the original data through the reader receiver 240.

As described above, when the RFID reader 200 receives data from one RFID tag, the RFID tag may extract the original data by performing simple logic operations, and the RFID reader 200 may receive the original data from the RFID tag. When the RFID reader 200 receives data from two or more RFID tags, the RFID reader 200 may simultaneously receive two or more spread spectrum data from the two or more RFID tags. Accordingly, a bandwidth of a communication channel may be efficiently utilized and the throughput may be improved.

The RFID communication method according to some example embodiments may be employed in various RFID systems, such as product management RFID systems, distribution/delivery RFID systems, warehousing management RFID systems, automatic inspection RFID systems, inventory management RFID systems, library management RFID systems, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A radio frequency identification (RFID) system, comprising:
 a plurality of RFID tags configured to store a plurality of spread spectrum data that are previously generated by spreading a plurality of original data with a plurality of orthogonal codes; and
 a RFID reader configured to
 transmit a data request command to the plurality of RFID tags by designating at least one RFID tag of the plurality of RFID tags, and
 simultaneously extract at least one of the plurality of original data respectively corresponding to the at least one RFID tags from at least one of the plurality of spread spectrum data transmitted from the at least one RFID tag, when receiving spread spectrum data from more than one RFID tag simultaneously, wherein, if the data request command indicates that two or more RFID tags of the plurality of RFID tags are designated, the two or more RFID tags transmit spread spectrum data stored in the two or more RFID tags to the RFID reader, and
 wherein, if the data request command indicates that one RFID tag of the plurality of RFID tags is designated, the one RFID tag extracts original data from spread spectrum data stored in the one RFID tag, and transmits the original data to the RFID reader.

2. A radio frequency identification (RFID) system, comprising:
 a plurality of RFID tags configured to store a plurality of spread spectrum data that are previously generated by spreading a plurality of original data with a plurality of orthogonal codes; and
 a RFID reader configured to
 transmit a data request command to the plurality of RFID tags by designating at least one RFID tag of the plurality of RFID tags, and
 simultaneously extract at least one of the plurality of original data respectively corresponding to the at least one RFID tags from at least one of the plurality of spread spectrum data transmitted from the at least one RFID tag, when receiving spread spectrum data from more than one RFID tag simultaneously., wherein the data request command includes identification information of the at least one RFID tag,
 wherein, if the data request command includes the identification information of two or more RFID tags of the plurality of RFID tags, the two or more RFID tags transmit spread spectrum data stored in the two or more RFID tags to the RFID reader, and
 wherein, if the data request command includes the identification information of one RFID tag of the plurality of RFID tags, the one RFID tag extracts original data from spread spectrum data stored in the one RFID tag, and transmits the original data to the RFID reader.

* * * * *